UNITED STATES PATENT OFFICE.

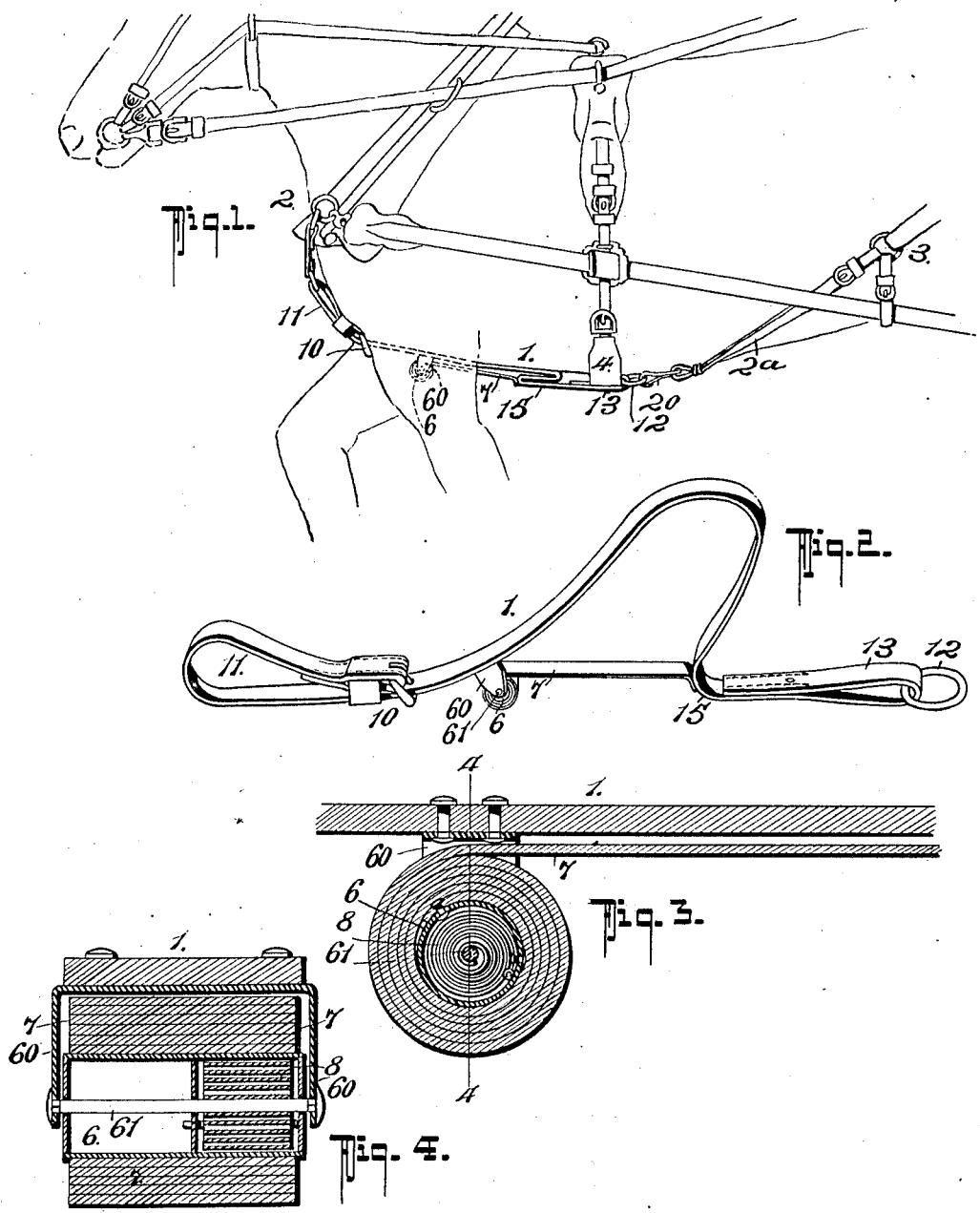

WILLAIM DAWSON, OF NEAR NARROWS, OREGON, ASSIGNOR OF ONE-HALF TO WILLIAM F. HARRIS, OF NARROWS, OREGON.

POLE-STRAP.

1,048,501.

Specification of Letters Patent.  Patented Dec. 31, 1912.

Application filed March 28, 1911. Serial No. 617,529.

*To all whom it may concern:*

Be it known that I, WILLAIM DAWSON, residing near Narrows, in the county of Harney and State of Oregon, have invented certain new and useful Improvements in Pole-Straps, of which the following is a specification.

This invention which generally relates to improvements in harness, more particularly seeks to provide a new improved arrangement of the pole strap portion of the harness.

My said invention consists in the peculiar construction and combination of parts all of which will be hereinafter fully explained, specifically pointed out in the appended claims and illustrated in the accompanying drawing, in which:—

Figure 1 is a side view of my invention, so much of a horse being shown to illustrate the practical application of my invention. Fig. 2 is a perspective view of the pole strap under normal conditions. Fig. 3 is a longitudinal section of a portion thereof, and Fig. 4 is a cross section thereof taken on the line 4—4 on Fig. 3.

When going up hill, slacks are caused in the quarter or side straps, and to such an extent that the animal very frequently gets one of its legs into the slack of said straps, and thereby causing a break either in the quarter strap or the pole strap, and sometimes injury to the animal.

My invention has for its object to avoid the conditions and inconveniences stated by automatically taking up the slacks in the pole straps and the quarter back strap in such a manner that it is impossible for the animal to get its legs through the same.

In the practical application of my invention, the pole strap 1, at its front end, has the adjustable buckle and loop members 10—11 for connecting with the neck yoke 2 in the usual manner, and the rear end thereof has a ring 12 for engaging the snap hook 20 on the forward end of the quarter strap 2ª, that joins with the breeching 3 in the usual manner.

4 designates the girth strap that passes through the loop 13 of the pole strap.

It will be noticed from the drawing that in my construction of harness the pole strap is somewhat longer than is usual whereby to provide a normally slack portion 15, that laps or extends under the front portion of the said strap 1. This slack portion of the pole strap provides for the necessary extension of the pole strap in going down a hill or at times when there is a strain on the pole strap, under which conditions the pole strap straightens out and lies flatwise against the body of the animal.

When going up a hill or whenever the strain on the pole strap is removed, the said strap loosens and hence there is also slack in the quarter strap. For keeping the quarter strap taut or to its extended position at all times, I have provided for transferring the slack of the quarter strap to the pole strap and for taking care of the extra slack in the said pole strap. For such purpose, I use a cylindrical roller 6, journaled in a bracket 60 riveted to the underside of the pole strap at a point toward the front end thereof. To the roller 6, is secured one end of a pliable strap 7, the other end of which is stitched to the pole strap at a point toward the rear end thereof.

Within the roller 6 is a coiled spring 8, one end of which fastens to the cylinder and the other to the shaft 61 of the said cylinder that is fixedly held in the bracket 60 and upon which the cylinder turns.

By reason of attaching the tension device at the place indicated and arranging it as shown, the extra slack in the pole strap is caused to fold the body of the strap 1 in such a manner that the spring tension or pull of the strap 7 holds the quarter strap taut under all conditions, and thereby keeps the said quarter strap snugly against the body of the horse and makes it impossible for the animal to get its hind legs through the said quarter strap.

Having thus described my invention, what I claim is:—

1. The improvement in harness comprising in combination with the neck yoke and the quarter strap, a pole strap connected at one end to the neck yoke and at the other end to the quarter strap, said pole strap being of such a length relatively to the neck yoke and the quarter strap that a portion normally folds upon itself, and means mounted on the pole strap for holding the said foldable portion under tension to normally pull the quarter strap taut.

2. The improvement in harness, consisting of a pole strap having means for connecting with the neck yoke and the quarter strap, said pole strap being of such length relatively to the neck yoke and the quarter strap that a portion foldable upon itself is provided, and means for holding the foldable portion under tension whereby the quarter strap is pulled taut at all times, said means consisting of a hollow roller, a shaft mounted on the pole strap at its forward end, on which the roller loosely turns, a coiled spring within the roller connected with the shaft and the roller, and a flexible strap connected at one end to the roller and at the other end to the pole strap at the rear end thereof.

Dated at Burns, Oregon, this 21st day of March, 1911.

WILLAIM DAWSON.

Witnesses:
G. A. REMBOLD,
CHAS. E. BEERY.

Copies of this patent may be obtained for five cents each, by addressing the "Commissioner of Patents, Washington, D. C."